United States Patent
Comtesse et al.

(10) Patent No.: US 10,228,224 B2
(45) Date of Patent: *Mar. 12, 2019

(54) METHOD AND DEVICE FOR LINEAR CONNECTION AND SEPARATION OF TWO ELEMENTS, WITH OFFSET ENERGY MEANS

(71) Applicant: Airbus Defence and Space SAS, Les Mureaux (FR)

(72) Inventors: Patrick Comtesse, Mezieres sur Seine (FR); Felipe Medina, La Celle-Saint-Cloud (FR); Luc Preaud, Gargenville (FR)

(73) Assignee: ArianeGroup SAS, Paris (FR)

( * ) Notice: Subject to any disclaimer, the term of this patent is extended or adjusted under 35 U.S.C. 154(b) by 125 days.

This patent is subject to a terminal disclaimer.

(21) Appl. No.: 14/908,834

(22) PCT Filed: Jul. 31, 2014

(86) PCT No.: PCT/EP2014/066504
§ 371 (c)(1),
(2) Date: Jan. 29, 2016

(87) PCT Pub. No.: WO2015/014942
PCT Pub. Date: Feb. 5, 2015

(65) Prior Publication Data
US 2016/0169646 A1    Jun. 16, 2016

(30) Foreign Application Priority Data
Aug. 1, 2013 (FR) ..................... 13 57637

(51) Int. Cl.
*F42B 15/36* (2006.01)
*B64G 1/64* (2006.01)
*F42B 15/38* (2006.01)

(52) U.S. Cl.
CPC .............. *F42B 15/36* (2013.01); *B64G 1/641* (2013.01); *B64G 1/645* (2013.01); *F42B 15/38* (2013.01)

(58) Field of Classification Search
CPC .......... F42B 15/36; F42B 15/38; B64G 1/641; B64G 1/645; B64G 1/64
See application file for complete search history.

(56) References Cited

U.S. PATENT DOCUMENTS

| 3,427,047 A | 2/1969 | Mayo |
| 4,648,227 A | 3/1987 | Reusch |

(Continued)

FOREIGN PATENT DOCUMENTS

| EP | 1355120 A1 * | 10/2003 | ............ F42B 15/38 |
| FR | 3009283 A1 * | 2/2015 | ............ B64G 1/641 |

(Continued)

OTHER PUBLICATIONS

French Search Report, dated May 15, 2014, priority document.

(Continued)

*Primary Examiner* — Benjamin P Lee
(74) *Attorney, Agent, or Firm* — Greer, Burns & Crain Ltd.

(57) ABSTRACT

A method and device enable the linear separation of two elements attached to each other through two connecting surfaces which are conical in this example, of a first element and a second element respectively, using thermite placed on the other side of the wall of the outer element, facing a connecting arrangement placed between both connecting surfaces. An electrical triggering of the thermite causes a quick and local warming-up, at the connecting arrangement which, after melting, enables both elements to be separated.

14 Claims, 3 Drawing Sheets

(56) References Cited

U.S. PATENT DOCUMENTS

| | | | |
|---|---|---|---|
| 5,402,728 A | 4/1995 | Garner | |
| 7,261,038 B2 * | 8/2007 | Cleveland | F42B 15/38 102/378 |
| 7,367,738 B2 * | 5/2008 | Cleveland | B64G 1/641 102/275.12 |
| 2008/0163748 A1 | 7/2008 | Facciano et al. | |
| 2012/0110823 A1 * | 5/2012 | Behar | B64G 1/645 29/428 |
| 2012/0137917 A1 * | 6/2012 | Golden | F42B 15/38 102/378 |

FOREIGN PATENT DOCUMENTS

| | | | |
|---|---|---|---|
| JP | 2002211500 | 7/2002 | |
| WO | 2007094801 | 8/2007 | |
| WO | 2011003965 | 1/2011 | |
| WO | WO 2015014943 A1 * | 2/2015 | B64G 1/641 |

OTHER PUBLICATIONS

"Pyrotechnic shaped charge separation systems for aerospace vehicles", F.Z. Smith, NASA Technical Memorandaum, Jul. 1, 1968.
International Search Report, dated Nov. 27, 2014.

* cited by examiner

METHOD AND DEVICE FOR LINEAR CONNECTION AND SEPARATION OF TWO ELEMENTS, WITH OFFSET ENERGY MEANS

CROSS-REFERENCES TO RELATED APPLICATIONS

This application claims the benefit of the French patent application No. 1357637 filed on Aug. 1, 2013, the entire disclosures of which are incorporated herein by way of reference.

BACKGROUND OF THE INVENTION

The invention relates to a linear separation, as smooth as possible, of a first element with respect to a second element, which are rigidly connected beforehand. The invention is preferably applicable to spatial launchers, for separating stages from each other, of a launcher and of its cap or a stage and the payload, of missiles, space probes, or even planes, in the case of a payload release. The purpose of this separation is to reduce the weight of the on-board assembly, or to release a payload. These applications are characterized in that there is a need for separating objects that may be fragile, for example a satellite, and the connection of which has had to undergo high mechanical loads, as those undergone when propelled by a launcher.

FIGS. 1A and 1B illustrate the principle of separation between two elements 1 and 2 of a launcher. The first element 1 is preferably an element with the rank n, preferably a first engine stage. The second element is an element with the rank n+1, either a second engine element, or a payload, for example a satellite. The linear separation, in the launcher axis, thus has to be carried out without deteriorating the base of the second element and, in the case where it is desired to recover the first element 1, without deteriorating the surface thereof, where the connection between both these elements 1 and 2 was located.

In the current state of the art, the connecting/separating system is mostly of four types, which are the following ones:

1) the connections by bolting, riveting and pyrotechnic cutting off by pressure and local temperature rise of the structure. These systems, due to their operation, generate ejected material debris. Moreover, the cutting off causes a significant impact in the structure, which may be damageable for the payloads of the launcher;

Patent document FR 2,947,808 shows an example of implementing such a solution.

2) The connections by bolting, riveting and pyrotechnic cutting off by rupturing the structure, through the deformation of a pyrotechnic element. This solution is the most employed and does not generate debris, but causes a very significant impact;

3) the connections by pyrotechnic bolting and rupturing or separating the nut. This type of solution generates much less impact than the two previous ones, but requires several bolts to transmit strains from one element to the other, thus generating higher failure risks because of the number of devices involved;

4) the connections by straps and rupturing the same by pyrotechnic bolts. This type of solution does not enable high strains to be transmitted between both elements and does not allow for too large of diameters for the launchers. Also in this case, the stress relief causes a high impact in the structures.

Generally, in the current state of these techniques, systems coming from these connecting-separating solutions have the feature of leaving most of the time, asperities on the external shape of the launcher, after the separation.

The purpose of the invention is to overcome the above-mentioned drawbacks.

SUMMARY OF THE INVENTION

To that end, a first main object of the invention is a method for linearly connecting and separating two elements linearly connected to each other, by a defined local connection, and that have to be securely linearly separated, the separation occurring by a quick warming-up, at or near the connection, this warming-up being remotely triggered.

According to the invention, the method comprises:
  connecting both elements at two respective corresponding surfaces of both these elements, by connecting means placed between two respective connecting surfaces of both elements, one of both connecting surfaces being a first separating surface of a separating wall having a second separating surface, opposite to the first separating surface;
  providing, on the second separating surface of the separating wall of the material, thermite, inflammable by an electrical control connection;
  pyrotechnically triggering the thermite to cause, only by its warming-up, the quick warming-up, and not the explosion, and the destruction of the connecting means.

A second main object of the invention is a device for connecting and linearly separating both elements linearly connected to each other by a defined local connection and that have to be securely separated, the separation occurring by a quick warming up, at or near the connection, the warming-up being remotely triggered.

According to the invention, the device comprises:
  means for connecting both elements, these connecting means being placed between two respective connecting surfaces of both elements, one of both connecting surfaces being the first surface of a separating wall, which has a second surface opposite to the first separating surface;
  thermite, placed on the second separating surface; and
  means for remotely pyrotechnically triggering the thermite.

In the preferential embodiment of the invention, both connecting surfaces are respective surfaces of both elements, the separating wall being the walls of one of both elements.

In this case, advantageously, both connecting surfaces are conical.

The connecting means comprise soldering or gluing.

Preferably, the separating wall is that of the element placed outside the other element, the material being placed in an outer cavity of this wall of the outer element.

A third object of the invention is an aeronautic launcher comprising at least one carrier stage comprising a first element and a stage carried by and attached to the carrier stage and comprising a second element, the launcher being characterized in that it comprises a plurality of previously described devices, distributed on the entire periphery of the launcher between both stages to secure them, and then separate them.

BRIEF DESCRIPTION OF THE DRAWINGS

The invention and its different characteristics will be better understood upon reading the following description, accompanied with several figures, respectively representing.

DETAILED DESCRIPTION OF THE PREFERRED EMBODIMENTS

Figure 1A:
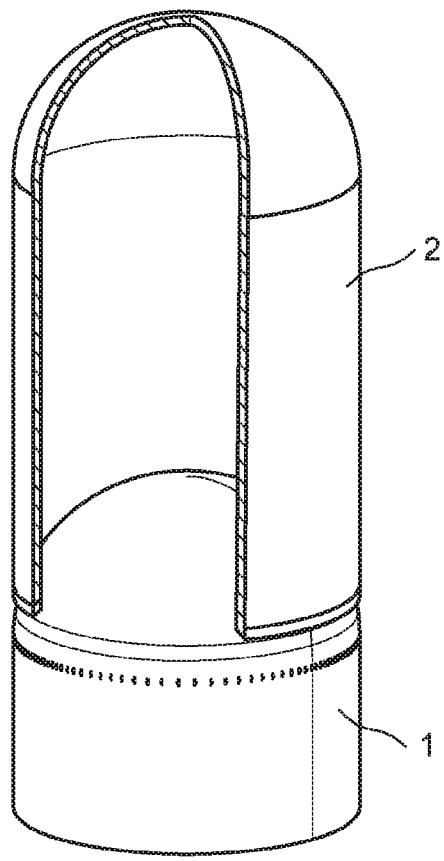
FIGS. 1A and 1B, a scheme representing the separation of two elements of a launcher.
Figure 1B:
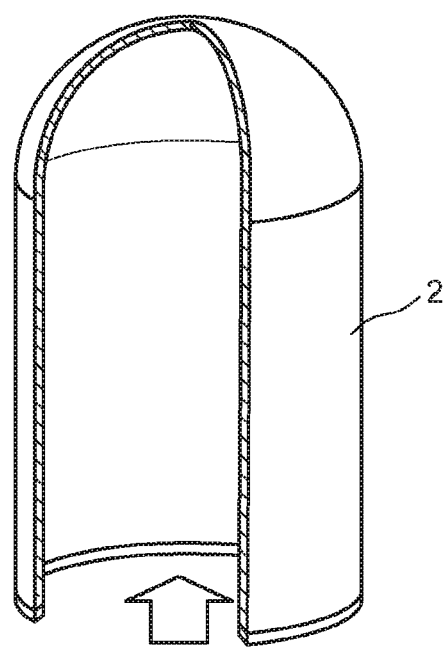
Figure 1B:
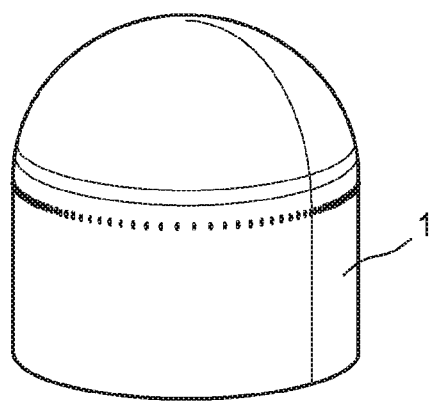
Figure 2:
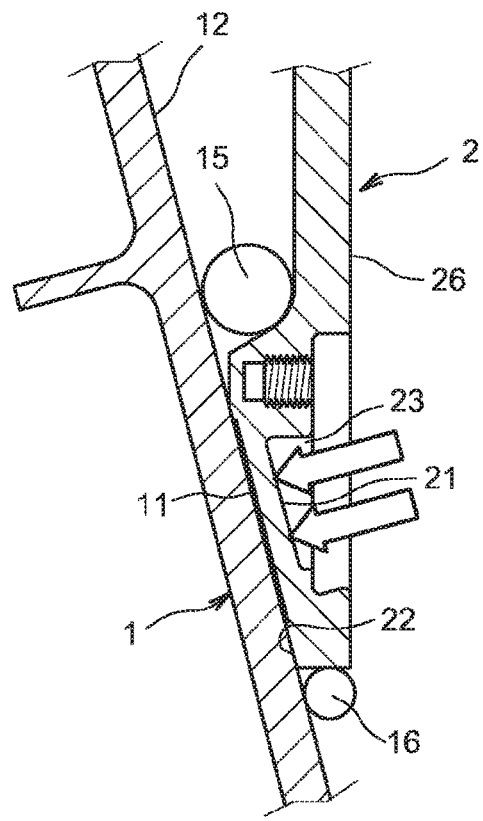
FIG. 2, in cross-section, the principle of the method according to the invention.

FIG. 2 shows a scheme of the method and the device according to the invention, applied to two elements 1 and 2, which are, in the preferential application of the invention, for the first element 1, an aerospace or aeronautic launcher with the rank n, for example the first stage of a launcher on the end of which is attached the second element, which is either a second launcher with a rank n+1, that is preferably a second launcher stage, or an operational load, for example containing equipment or a facility to be put into orbit. The front end of the first element 1 is conical, that is the outer wall 12 of this first element 1 is conical to facilitate the separation thereof, this conicity being optional. Correspondingly, the back end of the second element 2 has an inner wall 22, which is conical, with the same conicity as the outer wall 12 of the first launcher 1. The interface between both these surfaces, the outer surface 12 of the first launcher 1 and the inner surface 22 of the second launcher 2, comprises connecting means 11 to securely and reliably secure the elements 1 and 2 to each other. These connecting means 11 are, preferably, a soldering distributed on the entire periphery of both these surfaces. These connecting means can also be a glue provided in the same way. It is set out that the solder or glue tape is placed in a housing or recess of the upper structure, that is, of the second element 2.

To immobilize both elements 1 and 2, the latter are brought to the melting temperature of the solder or glue used for this assembly. For example, if these structures to be assembled are made of titanium and if the solder chosen is a silver alloy, the entire zone to be assembled is brought to the melting temperature of the silver alloy, that is, about 960° C. For this, several conventional methods are chosen, for example induction soldering, oven heating soldering, under a neutral atmosphere, or resistance soldering. For the assembly relative to the present invention, it is noted that induction soldering or resistance soldering are more suitable for high volumes. Once the soldering is carried out, the heating means are removed and the connection is thus operational.

To carry out the disengagement of both elements, that is the first element 1 and the second element 2, in a housing or recess 23 provided in the outer surface 26 of the second element 2, on a so-called second separating surface 21, facing the connecting means 11, are introduced heating means comprising a layer 24 of thermite (definition of thermite: a mixture of a metal fuel that can often be aluminum, but not only, and an oxidant, often a metal oxidant). It is set out here that the term thermite encompasses nanothermites. The first separating surface comprises the connecting surface 22 of the second element 2. The wall of the second element 2 here becomes a separating surface. Via a remote triggering by an electrical control connection 60, the quick warming-up of this thermite material 24 is triggered when it is desired to disengage the first element 1 from the second element 2. Hence, the connecting means 11, that is solder or glue, melt and both elements, that is the first element 1 and the second element 2, are separated.

The materials used to make up this thermite can be sheathed thermite. This type of material, by an exothermal oxidoreduction reaction, produces temperatures in the order of 2800°, from 1230° C. to 2770° K, by including the nanothermites. It is set out that the connecting means are thus placed surrounding the entire connection, that is, on the periphery of the assembly of the first element 1 and the second element 2.

The connection represented is advantageously completed with a first inner seal 15, placed between the first element and the second element and a second outer seal 16, placed between the first element and the second element, but outside the assembly.

Figure 3:
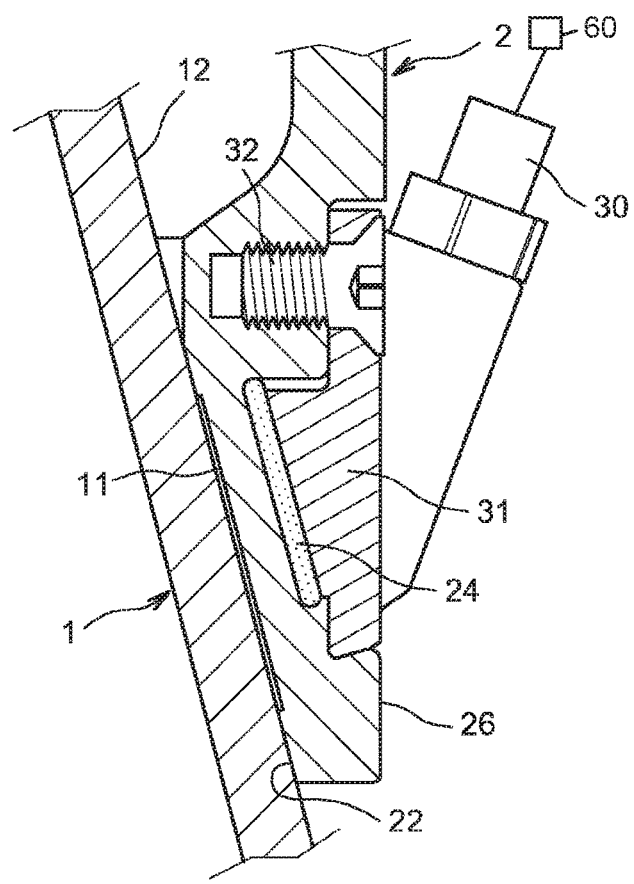
FIG. 3, in cross-section, one embodiment of the device according to the invention.

FIG. 3 shows again the same place, described by the present invention, in cross-section. However, triggering means have been represented. They comprise an igniter 30 of the type used by the pyrotechnical equipment. It is placed outside the second element, projecting from the outer surface 26 of the second element. A back-plate 31, made of several elements, ensures connection between this igniter 30 and the heating means, here comprising a thermite tape 24. The attachment of the igniter 30 to the second element 2 can be made by means of a screw-nut system 32, embedded in the thickness of the second element 2.

Figure 4:
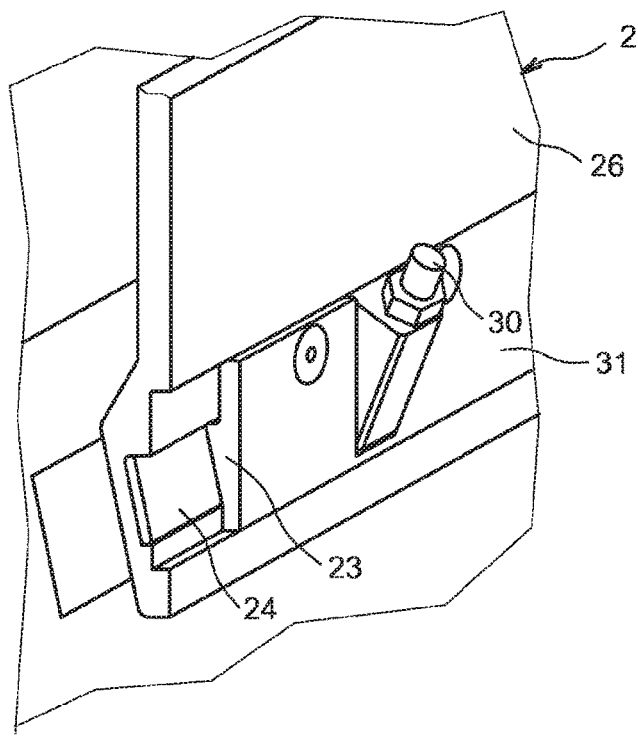
FIG. 4, in an isometric view, a certain embodiment of the device according to the invention.

FIG. 4 shows this igniter 30, screwed to the outer surface 26 of the second element 2. It can also be located inside. If a plurality of igniters 30 is thus necessary, on the entire periphery of the assembly, a same number of back-plates 31 is used to join the thermite tape 24 and the igniters 30. The back-plate 31 fills the housing 23, provided on the entire circumference of the outer surface 26 of the second element 2. These igniters 30 will thus cause the instantaneous ignition of the thermite tape 24, or of the equivalent material, if any. The temperature generated in the entire junction is adjusted by the amount of material making up the thermite, and the metal environment of the assembly. The heat emission diffuses in the structure, at the connection, which in turn transmits this heat to the solder, or glue 11. The latter 11 will reach its melting temperature and the disengagement of the first element 1 from the second element 2 will thus occur.

Figure 5:
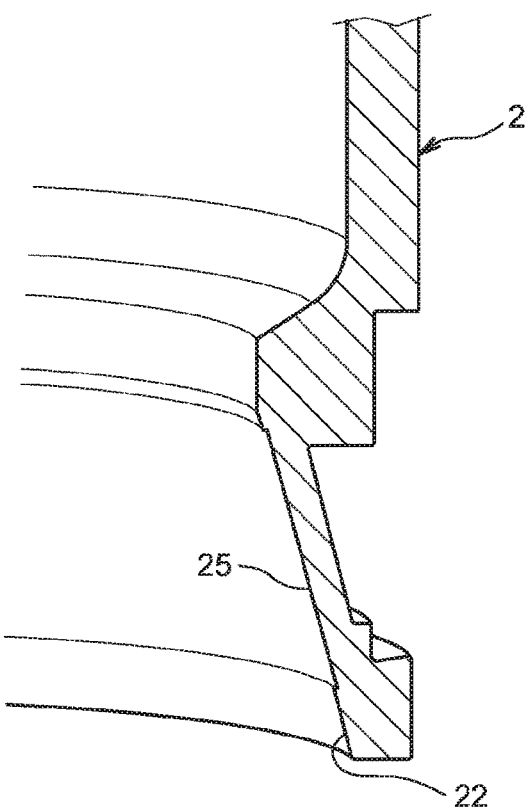
FIG. 5, in cross-section, a detail of the embodiment of the device according to the invention.

With regard to FIG. 5, a housing or recess 25 in which the connecting means 11 are placed, such as solder or glue, can be provided. This is a shallow cavity, surrounding the periphery of the inner surface 22 of the second element 2.

In the case of both elements of an aerospace launcher, the first element 1 and the second element 2 are intentionally under pressure. Hence, they will move away from each other, under the so-called champagne cork effect, along the linear axis of the assembly. In the case where there is no pressure inside these both elements, or between the structures, the distancing can be made by any other known means such as springs, distancing rockets, pneumatic means, or the like.

After the first element and the second element are disengaged, the internal structure of the second element has again a surface with neither protuberance, nor pull-out.

Moreover, the invention meets a provision of Article 5 of the Space Operations Act (SOA), relating to the Satellite Lunching Operators, in order to ensure the environment protection of the outer space, in particular for restricting risks related to space debris.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for linearly connecting and separating two elements, a first element and a second element linearly attached to each other via a defined local connection and that are to be securely separated, the separation occurring by a quick warming-up, at or near the connection, the warming-up being remotely triggered, comprising the steps:

connecting the first and second elements at two respective and corresponding connecting surfaces of the first element and the second element, with a connecting material comprising solder, the solder being placed between the two connecting surfaces, one of the two connecting surfaces being a first surface on a first side of a separating wall having a second surface on a second side opposite to the first side;

providing, on the second surface, thermite, inflammable by an electrical control connection; and pyrotechnically triggering said thermite to cause, only by its warming-up, the quick warming-up and destruction of the connecting means.

2. The method of claim 1 wherein the second side is an outer side of the separating wall.

3. The method of claim 1 wherein the second surface is an outer surface.

4. The method of claim 1 wherein the separating wall is conical.

5. A device for connecting and linearly separating two elements, a first element and a second element linearly connected to each other by a defined local connection and that are to be securely separated, the separation occurring by a quick warming-up, at or near the connection, the warming-up being remotely triggered, the device comprising:

a connecting arrangement comprising a soldering of the first and second elements together, the arrangement being placed between two respective connecting surfaces of the first element and the second element, one of both connecting surfaces being a first surface on a first side of a separating wall, the separating wall having a second surface on a second side opposite to the first side;

thermite placed on the second surface of the separating wall; and an electronic control arranged to pyrotechnically trigger the thermite.

6. The device according to claim 5, wherein both connecting surfaces are respective surfaces of the first and second elements, the separating wall being the wall of one of both elements.

7. The device according to claim 6, wherein the separating wall is that of the element placed outside the other element, the material being placed in a recess provided on the wall of the outer element.

8. The device of claim 5 wherein the second side is an outer side of the separating wall.

9. The device of claim 5 wherein the second surface is an outer surface.

10. The device of claim 5 wherein the separating wall is conical.

11. An aeronautic launcher comprising:

at least one carrier stage comprising a first element, and a stage carried by and attached on the carrier stage comprising a second element, a plurality of devices distributed over the entire circumference of the launcher, between both stages, to secure them, and then separate them, the devises comprising:

a connecting arrangement comprising a soldering of the first and second elements together, the arrangement being placed between two respective connecting surfaces of the first element and the second element, one of both connecting surfaces being a first surface on a first side of a separating wall, the separating wall having a second surface on a second side opposite to the first side; and thermite placed on the second surface of the separating wall; and an electronic control arranged to pyrotechnically trigger the thermite, both connecting surfaces being conical.

12. The aeronautic launcher of claim 11 wherein the second side is an outer side of the separating wall.

13. The aeronautic launcher of claim 11 wherein the second surface is an outer surface.

14. The aeronautic launcher of claim 11 wherein the separating wall is conical.

* * * * *